United States Patent
Li

(10) Patent No.: US 10,173,251 B2
(45) Date of Patent: Jan. 8, 2019

(54) CLEANING DEVICE FOR CLEANING A GLASS SUBSTRATE AND A SEMI-FINISHED ARRAY SUBSTRATE

(71) Applicant: Shenzhen China Star Optoelectronics Technology Co., Ltd., Shenzhen, Guangdong (CN)

(72) Inventor: Zijian Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 287 days.

(21) Appl. No.: 14/417,814

(22) PCT Filed: Jan. 12, 2015

(86) PCT No.: PCT/CN2015/070550
§ 371 (c)(1),
(2) Date: May 6, 2016

(87) PCT Pub. No.: WO2016/095299
PCT Pub. Date: Jun. 23, 2016

(65) Prior Publication Data
US 2016/0243600 A1  Aug. 25, 2016

(30) Foreign Application Priority Data
Dec. 18, 2014 (CN) .......................... 2014 1 0797975

(51) Int. Cl.
*B08B 1/02* (2006.01)
*B08B 3/02* (2006.01)
(Continued)

(52) U.S. Cl.
CPC ............... *B08B 11/00* (2013.01); *B05B 1/28* (2013.01); *B08B 3/02* (2013.01); *B08B 3/022* (2013.01);
(Continued)

(58) Field of Classification Search
CPC ........... B08B 3/022; B08B 3/02; B08B 3/041; B08B 7/00; B08B 7/0057; B08B 5/023;
(Continued)

(56) References Cited

U.S. PATENT DOCUMENTS 3,726,581 A * 4/1973 Doepke ................. A47L 15/504
  312/311
5,413,131 A * 5/1995 Medlock ............... A23N 12/023
  134/104.4
(Continued)

FOREIGN PATENT DOCUMENTS

CN   1194454 A    9/1998
CN   101312119 A  11/2008
(Continued)

OTHER PUBLICATIONS

Chinese Office Action and Search Report, dated Feb. 2, 2016, China.
(Continued)

*Primary Examiner* — Joseph L. Perrin
*Assistant Examiner* — Irina Graf
(74) *Attorney, Agent, or Firm* — Andrew C. Cheng

(57) ABSTRACT

Provided is a cleaning device, comprising a plurality of cleaning units, and a conveyor which is used for connecting the plurality of cleaning units. Each of the plurality of cleaning units includes a body having a working chamber, and a liquid spray unit. At least one of the plurality of cleaning units comprises a plurality of baffles arranged between the liquid spray unit and the conveyor, and a driving mechanism. The driving mechanism is configured to actuate each of the plurality of baffles into rotation along a first direction to overlap with adjacent baffles, and further actuate each of the plurality of baffles into rotation along an opposite direction of the first direction.

9 Claims, 3 Drawing Sheets

(51) Int. Cl.
*B08B 11/00* (2006.01)
*B08B 3/04* (2006.01)
*B08B 5/02* (2006.01)
*B08B 7/00* (2006.01)
*B05B 1/28* (2006.01)
*B08B 17/02* (2006.01)
*C03C 23/00* (2006.01)

(52) U.S. Cl.
CPC ............ *B08B 3/041* (2013.01); *B08B 5/023* (2013.01); *B08B 7/0057* (2013.01); *B08B 17/02* (2013.01); *C03C 23/0075* (2013.01)

(58) Field of Classification Search
CPC ........... B08B 17/02; B08B 11/00; B05B 1/28; C03C 23/0075
See application file for complete search history.

(56) References Cited

U.S. PATENT DOCUMENTS

| | | | |
|---|---|---|---|
| 6,191,428 B1* | 2/2001 | Gilberti | A61L 2/10 250/493.1 |
| 7,946,302 B2* | 5/2011 | Wallace | B05C 3/10 134/124 |
| 8,426,778 B1* | 4/2013 | Bolt | B05D 3/067 219/405 |
| 2005/0098553 A1* | 5/2005 | Devine | F27B 17/0025 219/411 |
| 2005/0241674 A1* | 11/2005 | Demchuk | B08B 3/026 134/10 |
| 2011/0146705 A1* | 6/2011 | Hart | H01L 21/02041 134/2 |

FOREIGN PATENT DOCUMENTS

| | | |
|---|---|---|
| CN | 101465280 A | 6/2009 |
| CN | 101514441 A | 8/2009 |
| CN | 201899095 U | 7/2011 |
| CN | 201921860 U | 8/2011 |
| CN | 102825050 A | 12/2012 |
| CN | 102942046 A | 2/2013 |
| CN | 202824004 U | 3/2013 |
| CN | 103681237 A | 3/2014 |
| CN | 103752571 A | 4/2014 |
| CN | 103962346 A | 8/2014 |
| CN | 104058112 A | 9/2014 |
| JP | 1993092263 A | 4/1993 |
| JP | 2011092891 A | 5/2011 |
| KR | 1020110004956 A | 1/2011 |

OTHER PUBLICATIONS

International Search Report and Written Opinion, dated Jan. X, 2015, China.

* cited by examiner

CLEANING DEVICE FOR CLEANING A GLASS SUBSTRATE AND A SEMI-FINISHED ARRAY SUBSTRATE

CROSS-REFERENCE TO RELATED APPLICATIONS

The present application claims benefit of Chinese patent application CN 201410797975.1, entitled "Cleaning device" and filed on Dec. 18, 2014, the entirety of which is incorporated herein by reference.

FIELD OF THE INVENTION

The present disclosure relates to a cleaning device, and in particular, to a cleaning device for cleaning a glass substrate and a semi-finished array substrate.

BACKGROUND OF THE INVENTION

In a manufacturing process of an array substrate, a glass substrate is first to be made into a semi-finished array substrate before being manufactured into a finished array substrate. In such a process, it is necessary to clean objects to be cleaned, such as the glass substrate and the semi-finished array substrate, through a plurality of cleaning steps that are typically performed in one single cleaning device.

The cleaning device can comprise a first cleaning unit which can remove organics from an object to be cleaned using ultraviolet light; a second cleaning unit which can remove particles from the object to be cleaned using water and gases; a third cleaning unit which can remove organics and metal ions from the object to be cleaned using ozone water, or can oxidize amorphous silicon (i.e., a-Si) on the object to be cleaned using ozone water, so as to form a silicon oxide (i.e., SiOx) layer on a surface of the a-Si; a fourth cleaning unit which can remove the SiOx layer through hydrofluoric acid etching; a fifth cleaning unit for second removal of particles from the object to be cleaned using hydrogen water; a sixth cleaning unit which can oxidize the surface of the a-Si on the object to be cleaned into a homogeneous and compact SiOx layer using ozone water; a seventh cleaning unit which can remove particles from the object to be cleaned using water and a gas; and an air-dying unit which can blow-dry the object to be cleaned.

When the cleaning device is used to clean a glass object to be cleaned, such as a glass substrate, it is only necessary for the glass object to be successively cleaned by the first, the second, the third, and the seventh cleaning units, and the air-dying unit, while the fourth, the fifth, and the sixth cleaning units will be left unused. In the entire cleaning procedure, however, the object to be cleaned has to pass through the fourth, the fifth, and the sixth cleaning units as well, which, after being frequently used, would very likely be subjected to liquid leakage. As a result, liquid leakages thereof might drip onto the glass substrate passing therethrough. As the hydrofluoric acid of the fourth cleaning unit can corrode a glass substrate, where the hydrofluoric acid drips onto the glass substrate, the glass substrate after being cleaned will become useless.

SUMMARY OF THE INVENTION

In order to solve the above problem, the present disclosure provides a cleaning device, which can prevent liquid leakages dripping from non-used cleaning units from dripping onto an object to be cleaned, thus preventing the liquid leakages from harming or affecting the object to be cleaned.

The present disclosure provides a cleaning device, comprising a plurality of cleaning units, and a conveyor which is used for connecting the plurality of cleaning units and capable of conveying an object to be cleaned. Each of the plurality of cleaning units includes a body, a working chamber formed within the body, and a liquid spray unit arranged in the working chamber and capable of spraying liquid to the object to be cleaned. The conveyor runs through the working chamber and is located below the liquid spray unit, and at least one of the plurality of cleaning units comprises a plurality of baffles arranged between the liquid spray unit and the conveyor, and a driving mechanism arranged in the working chamber. The driving mechanism is configured to actuate each of the plurality of baffles into rotation along a first direction to overlap with adjacent baffles, so as to prevent liquid leakages dripping from the liquid spray unit from dripping onto the object to be cleaned, and further actuate each of the plurality of baffles into rotation along an opposite direction of the first direction, so as to open the liquid spray unit wide.

In one embodiment, the driving mechanism comprises a lifting part that can rise and fall along a vertical direction, and a plurality of pull rods, each of which has one end hinged to a corresponding baffle, and another end fixedly connected to the lifting part.

In one embodiment, two ends of each of the plurality of baffles are respectively connected to the lifting part by means of corresponding pull rods.

In one embodiment, the lifting part is connected to a top wall of the working chamber by means of a translation member, so as to be actuated for a lifting movement.

In one embodiment, the cleaning device further comprises a plurality of support rods, each of which has a bottom end hinged to a corresponding baffle, and a top end connected to a side wall of the working chamber by means of a shifting bar.

In one embodiment, the shifting pair comprises a slotted hole arranged at a top end of a corresponding support rod, and a pin fixed on the side wall of the working chamber and capable of being engaged into the slotted hole.

In one embodiment, after the plurality of baffles is overlapped with one another, a hinge position of any one of the plurality of pull rods to a corresponding baffle is lower than a hinge position of a corresponding support rod to the corresponding baffle.

In one embodiment, an overlapping surface of any two adjacent baffles is in the form of an inclined surface, a curved surface, or a bend surface.

In one embodiment, the plurality of baffles is in the form of a plurality of rectangles, which can facilitate manufacture and cost saving thereof.

In one embodiment, the object to be cleaned is a glass substrate or a semi-finished array substrate.

According to the cleaning device of the present disclosure, at least one of the plurality of cleaning units is provided with a plurality of rotatable baffles therein. The baffles can form a complete plane after being overlapped with one another, to receive liquid leakages dripping from the liquid spray unit arranged in the cleaning unit. This can prevent the liquid leakages from continuously flowing downward to drip onto the object to be cleaned. Thus, the liquid leakages dripping from non-used cleaning units can be prevented from dripping onto the object to be cleaned, thus avoiding the object to be cleaned from being harmed or affected by the liquid leakages.

In addition, the cleaning device according to the present disclosure can be easily assembled and safely used, thus facilitating implementations of promotion and use thereof.

BRIEF DESCRIPTION OF THE DRAWINGS

In the following, the present disclosure will be explained in detail based on embodiments in connection with accompanying drawings, in which.

Figure 1:
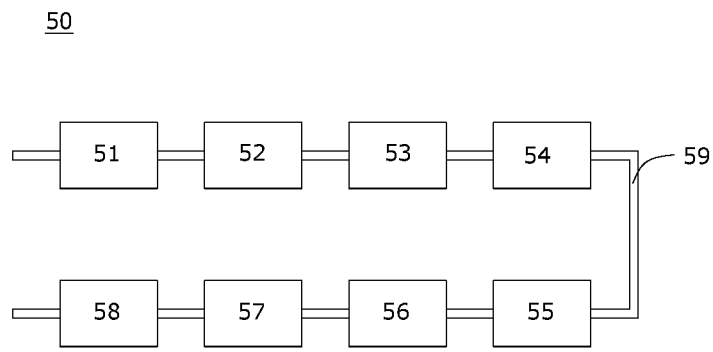
FIG. 1 schematically shows the structure of a cleaning device according to the present disclosure.

It should be noted that none of FIGS. 3-6 indicates a body or a working chamber of the cleaning unit of the cleaning device. Moreover, in the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

FIG. 1 shows a cleaning device 50 according to the present disclosure. The cleaning device 50 comprises a plurality of cleaning units, and a conveyor which is used for connecting the plurality of cleaning units and capable of conveying an object to be cleaned. The conveyor can be used to connect the plurality of cleaning units, so as to facilitate conveyance of the object to be cleaned to each of the cleaning units successively. The cleaning device 50 can be one used for cleaning a glass substrate and a semi-finished array substrate, and can absolutely be one used for cleaning other products and workpieces that need cleaning. In the following, the present disclosure will be explained in detail, with the cleaning device 50 used for cleaning a glass substrate and a semi-finished array substrate as an example.

The cleaning device 50 comprises seven cleaning units, respectively as a first cleaning unit 51 which can remove organics from an object to be cleaned using ultraviolet light; a second cleaning unit 52 which can remove particles from the object to be cleaned using water and gases; a third cleaning unit 53 which can remove organics and metal ions from the object to be cleaned using ozone water, or can oxidize amorphous silicon on the object to be cleaned using ozone water, so as to form a silicon oxide layer on a surface of the amorphous silicon; a fourth cleaning unit 54 which can remove the silicon oxide layer through hydrofluoric acid etching; a fifth cleaning unit 55 which can be used for second removal of particles from the object to be cleaned using hydrogen water; a sixth cleaning unit 56 which can oxidize the surface of the amorphous silicon into a homogeneous and compact silicon oxide layer using ozone water; a seventh cleaning unit 57 which can remove particles from the object to be cleaned using water and gases; an air-dying unit 58, and a conveyor 59. The conveyor 59 can be used to connect all of the plurality of cleaning units in series, so as to facilitate conveyance of the object to be cleaned to each of the plurality of cleaning units, successively. The plurality of cleaning units and the conveyor 59 are each well known in the art, and therefore will not be explained in detail herein.

When the cleaning device 50 is used to clean a glass substrate, although the fourth cleaning unit 54 is unnecessary in cleaning of the glass substrate, liquid leakages having dripped onto the glass substrate therefrom will corrode the glass substrate. This will prevent the glass substrate from working properly. Therefore, it will be necessary for the fourth cleaning unit 54 to have a mechanism or structure that can prevent the liquid leakages therefrom from dripping onto the glass substrate. In addition, when the cleaning device 50 is used to clean a semi-finished array substrate or other products, other cleaning units or combinations of cleaning units can also be left unused, and therefore will need a mechanism or structure that can prevent a liquid leakage from dripping onto the object to be cleaned. One skilled in the art can select which cleaning unit is to be provided with such a mechanism or structure that can prevent a liquid leakage from dripping onto the object to be cleaned based on practical requirements. A simplest solution is to arrange such a mechanism or structure that can prevent a liquid leakage from dripping onto the object to be cleaned in each of the plurality of cleaning units, whereby a corresponding mechanism can be activated where necessary.

Figure 2:
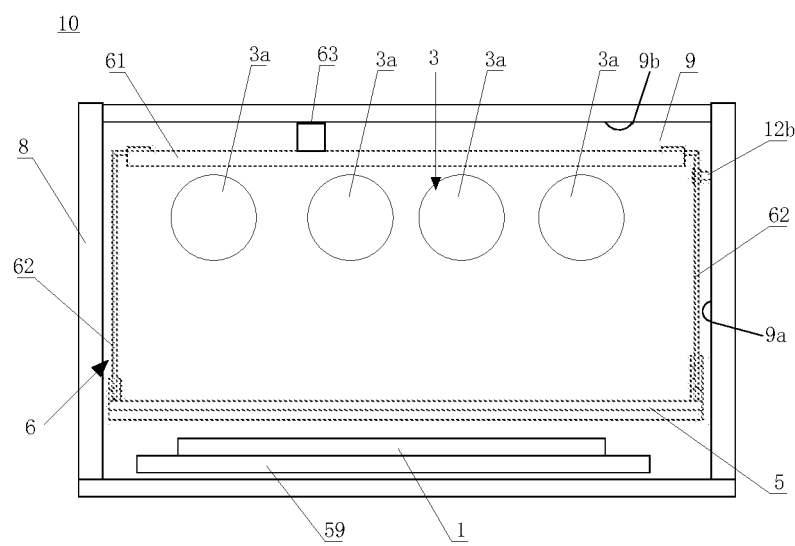
FIG. 2 schematically shows the structure of a cleaning unit of the cleaning device according to the present disclosure.

FIG. 2 shows a cleaning unit 10, which can be any one of the plurality of cleaning units arranged in the cleaning device 50. The cleaning unit 10 comprises a body 8, a working chamber 9 formed within the body 8, and a liquid spray unit 3 arranged in the working chamber 9 and capable of spraying liquid to an object 1 to be cleaned. The conveyor 59, which runs through the working chamber 9 and is located below the liquid spray unit 3, can convey the object 1 to be cleaned from a previous cleaning unit to a subsequent cleaning unit. The liquid spray unit 3 can comprise a plurality of liquid spray members 3a, which can be selected as spray nozzles capable of spraying liquid on a surface of the object 1 to be cleaned, so as to achieve a cleaning or etching function of the cleaning unit 10.

In order to prevent a liquid leakage dripping from the liquid spray unit 3 from dripping onto the object 1 to be cleaned, the cleaning unit 10 can further comprise a plurality of rotatable baffles 5 arranged between the liquid spray unit 3 and the conveyor 59, and a driving mechanism 6 that is configured to actuate each of the plurality of baffles 5 into rotation. The baffles 5 can be in the form of rectangles, which can facilitate manufacture and cost saving thereof. The liquid leakage as aforementioned refers to a liquid dripping from the liquid spray unit 3 when it is not working.

Figure 3:
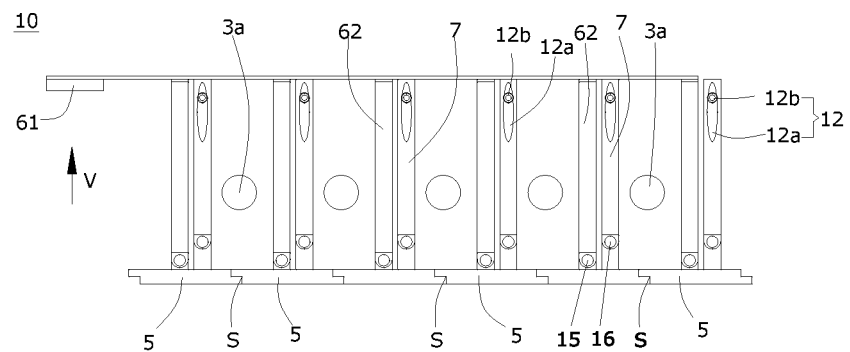
FIG. 3 schematically shows the structure of the cleaning unit of the cleaning device according to the present disclosure, in which a plurality of baffles is in a closed state.
Figure 4:
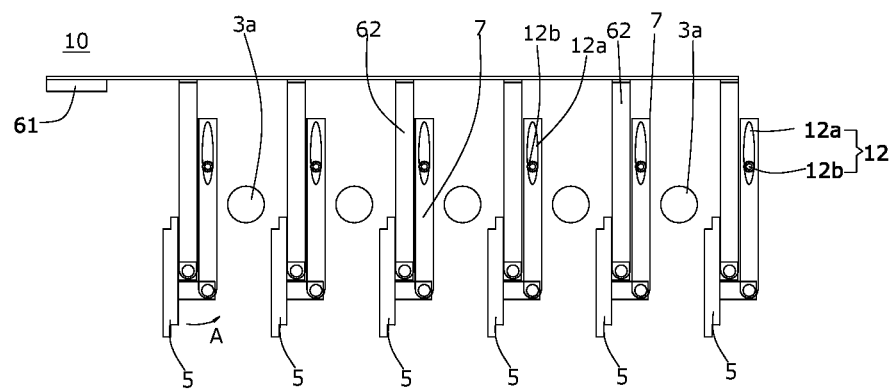
FIG. 4 schematically shows the structure of the cleaning unit of the cleaning device according to the present disclosure, in which the plurality of baffles is in an open state.

As shown in FIGS. 3-6, the driving mechanism 6 not only can actuate rotation of each of the plurality of baffles 5 along a first direction, and enable overlapping of each of the plurality of baffles 5 with adjacent baffles (i.e., a closed state), so as to prevent a liquid leakage dripping from the liquid spray unit 3 from dripping onto the object 1 to be cleaned, but also can actuate rotation of each of the plurality of baffles 5 along an opposite direction of the first direction, so as to open the liquid spray unit 3 wide, i.e., open all of the spray nozzles 3a arranged in the liquid spray unit 3, an open state for short. As indicated in FIG. 3, when each of the plurality of baffles 5 overlaps with adjacent baffles, a complete plane can be formed for receiving liquid leakages dripping from the liquid spray unit 3, so as to prevent the liquid leakages from continuously flowing down and thus dripping onto the object 1 to be cleaned. This can prevent the liquid leakages from harming or affecting the object to be cleaned.

Figure 5:
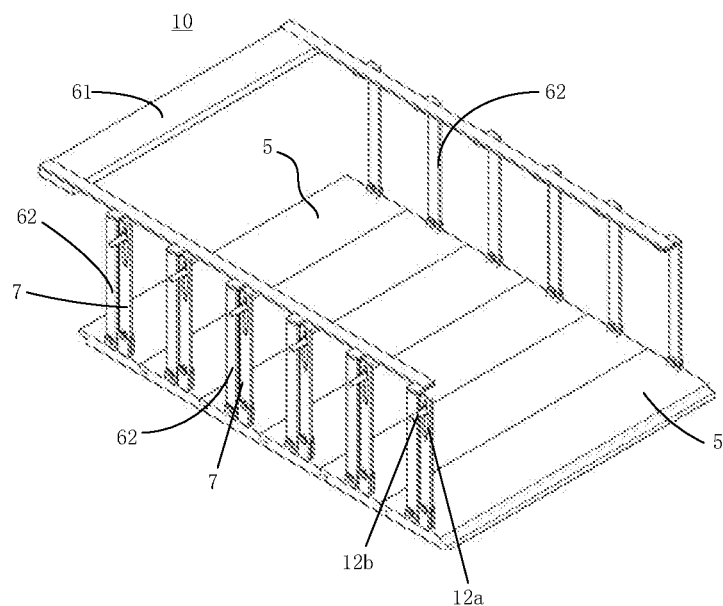
FIG. 5 is a perspective view of the cleaning unit of the cleaning device according to the present disclosure, in which the plurality of baffles is in a closed state.

As shown in FIGS. 3 to 6, the driving mechanism 6 can comprise a lifting part 61 that can rise and fall along a vertical direction V, and a plurality of pull rods 62. As FIG. 2 indicates, the lifting part 61 can be connected to a top wall of the working chamber 9 by means of a translation member 63, so as to achieve rise and fall of the lifting part 61. The translation member 63 can be selected as a linear motor or a hydraulic cylinder. Each of the plurality of pull rods 62 has one end hinged to a corresponding baffle 5, and another end connected to the lifting part 61. Hinge joints between the plurality of pull rods 62 and the plurality of baffles 5 can allow said plurality of baffles 5 to rotate. As shown in FIG. 5, two ends of each of the plurality of baffles 5 are respectively connected to the lifting part 61 by means of corresponding pull rods 62. This can improve stability of the baffles 5, and prevent occurrence of deformation thereof to a certain degree.

Figure 6:
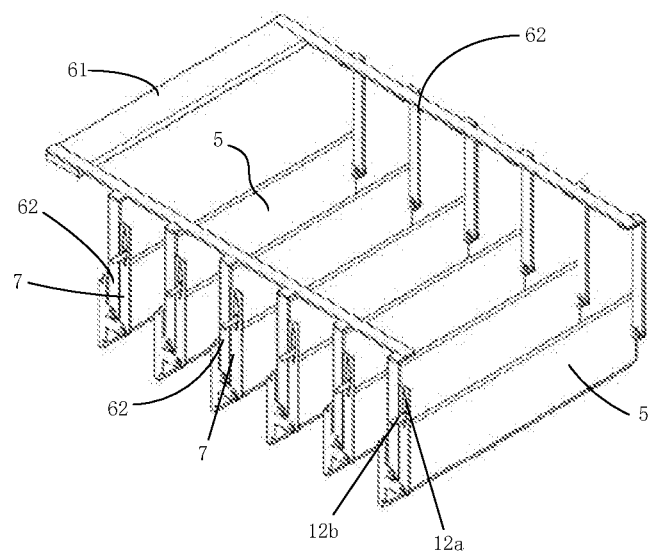
FIG. 6 is a perspective view of the cleaning unit of the cleaning device according to the present disclosure, in which the plurality of baffles is in an open state.

In one embodiment not shown, the plurality of baffles 5 can be disposed between the liquid spray unit 3 and the conveyor 59 by means of a plurality of vertical rods, each of which can have a top end fixed to the top wall of the working chamber 9, and a bottom end hinged to a corresponding baffle 5. In one preferred embodiment, however, the cleaning unit 10 can further comprise a plurality of support rods 7. As shown in FIG. 5 or FIG. 6, the number of the support rods 7 can be the same as that of the baffles 5. A bottom end of each of the plurality of support rods 7 is hinged to an end portion of a corresponding baffle 5, while a top end of each of the plurality of support rods 7 is connected to a side wall of the working chamber 9 by means of a shifting pair 12. The shifting pair 12 can comprise a slotted hole 12a provided at the bottom end of a corresponding support rod 7, and a pin 12b fixed on a side wall 9a of the working chamber 9 and can be engaged into the slotted hole 12a, as indicated in FIG. 2 or 3.

As shown in FIGS. 3-6, the lifting part 61, when going up, can pull the plurality of baffles 5 through the plurality of pull rods 62. As a result, the plurality of baffles 5 moves upward, and meanwhile, drives the plurality of support rods 7 to move upward as well, until a bottom end of the slotted hole 12a provided on each of the plurality of support rods 7 contacts a corresponding pin 12b. Afterwards, the lifting part 61 which is continuously rising can thus, by means of the plurality of pull rods 62, actuate each of the plurality of baffles 5 into rotation along an opposite direction of a first direction A, until each of the plurality of baffles 5 is set free from an overlapping relationship with adjacent baffles and thus the liquid spray unit 3 is wide open. Since the plurality of baffles 5 only starts rotating after it is raised along with the plurality of support rods 7, the baffles 5 will be rotating free from hindrance of the object to be cleaned, thus achieving smooth rotation thereof.

In one preferred embodiment, when the baffles 5 each have been overlapped with one another, a hinge position 15 between any one of the plurality of pull rods 62 and a corresponding baffle 5 is lower than a hinge position 16 between a corresponding support rod 7 and said corresponding baffle 5, as indicated in FIG. 3. Such being the case, each of the plurality of baffles 5 can rotate smoothly along the first direction A.

In one preferred embodiment, an overlapping surface S of any two adjacent baffles 5 is in the form of an inclined surface, a curved surface, or a bend surface. The overlapping surface S in such forms can increase a contact surface between the baffles 5, and improve sealing properties thereof, thus preventing continuous dripping of liquid leakages therefrom.

According to the cleaning device 50 of the present disclosure, at least one of the plurality of cleaning units 10 is provided with a plurality of rotatable baffles 5 therein. The plurality of baffles 5 can form a complete plane after being overlapped with one another, to receive liquid leakages dripping from the liquid spray unit 3 arranged in the cleaning unit 10. This can prevent the liquid leakages from continuously flowing downward to drip onto the object 1 to be cleaned. Thus, the liquid leakages dripping from non-used cleaning units 10 can be prevented from dripping onto the object 1 to be cleaned, thereby avoiding the object to be cleaned from being harmed or affected by the liquid leakages.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific embodiments disclosed herein, but rather includes all the technical solutions falling within the scope of the claims.

The invention claimed is:

1. A cleaning device for cleaning a glass substrate and a semi-finished array substrate, comprising a plurality of cleaning units, and a conveyor which is used for connecting the plurality of cleaning units and capable of conveying an object to be cleaned, wherein each of the plurality of cleaning units includes a body, a working chamber formed within the body, and a liquid spray unit arranged in the working chamber and capable of spraying liquid to the object to be cleaned, wherein the conveyor runs through the working chamber and is located below the liquid spray unit, and at least one of the plurality of cleaning units comprises a plurality of baffles arranged between the liquid spray unit and the conveyor, a plurality of support rods, each of which has a bottom end hinged to a corresponding baffle and a top end connected to a side wall or a top wall of the working chamber, and a driving mechanism arranged in the working chamber, and wherein the driving mechanism is configured to actuate each of the plurality of baffles into rotation along a first direction to overlap with adjacent baffles, configured to form a complete plane so as to prevent liquid leakages dripping from the liquid spray unit from dripping onto the object to be cleaned, and further actuate each of the plurality of baffles into rotation along an opposite direction of the first direction, so as to open the liquid spray unit, the driving mechanism comprises a lifting part movable along a vertical direction, and a plurality of pull rods, each of which has one end hinged to a corresponding baffle, and another end fixedly connected to the lifting part, the lifting part is connected to the top wall of the working chamber by means of a translation member, and configured to be actuated for a lifting movement, the translation member is a linear motor or a hydraulic cylinder, and the lifting part is located above the each pull rod and between the each pull rod and the translation member.

2. The cleaning device for cleaning a glass substrate and a semi-finished array substrate according to claim 1, wherein two ends of each of the plurality of baffles are respectively connected to the lifting part by means of corresponding pull rods.

3. The cleaning device for cleaning a glass substrate and a semi-finished array substrate according to claim 1, wherein the top end of each of the plurality of support rods is connected to the side wall of the working chamber by means of a shifting pair.

4. The cleaning device for cleaning a glass substrate and a semi-finished array substrate according to claim 3, wherein the shifting pair comprises a slotted hole arranged at the top end of a corresponding support rod, and a pin fixed on the side wall of the working chamber and capable of being engaged into the slotted hole.

5. The cleaning device for cleaning a glass substrate and a semi-finished array substrate according to claim 4, wherein after the plurality of baffles is overlapped with one another, a hinge position of any one of the plurality of pull rods to a corresponding baffle is lower than a hinge position of a corresponding support rod to the corresponding baffle.

6. The cleaning device for cleaning a glass substrate and a semi-finished array substrate according to claim 5, wherein after the plurality of baffles is overlapped with one another, an overlapping surface of any two adjacent baffles is in the form of an inclined surface, a curved surface, or a bend surface.

7. The cleaning device for cleaning a glass substrate and a semi-finished array substrate according to claim 6, wherein the plurality of baffles is in the form of a plurality of rectangles.

8. The cleaning device for cleaning a glass substrate and a semi-finished array substrate according to claim 1, wherein after the plurality of baffles is overlapped with one another, an overlapping surface of any two adjacent baffles is in the form of an inclined surface, a curved surface, or a bend surface.

9. The cleaning device for cleaning a glass substrate and a semi-finished array substrate according to claim 8, wherein the plurality of baffles is in the form of a plurality of rectangles.

\* \* \* \* \*